United States Patent [19]

Hedges

[11] 4,247,786
[45] Jan. 27, 1981

[54] ENERGY MANAGEMENT METHOD USING UTILITY-GENERATED SIGNALS

[75] Inventor: Walter P. Hedges, Laveen, Ariz.

[73] Assignee: Cyborex Laboratories, Inc., Phoenix, Ariz.

[21] Appl. No.: 20,810

[22] Filed: Mar. 15, 1979

[51] Int. Cl.³ .......................... H02J 4/00; H02J 3/00
[52] U.S. Cl. ........................................ 307/35; 307/39; 340/310 A; 340/163
[58] Field of Search ................... 307/35, 41, 38, 39, 307/31, 32, 33, 34; 340/147 R, 163, 310 A; 364/492, 493

[56] References Cited

U.S. PATENT DOCUMENTS

| | | | |
|---|---|---|---|
| 4,023,043 | 5/1977 | Stevenson | 307/38 |
| 4,125,782 | 11/1978 | Pollnow | 307/35 |
| 4,152,605 | 5/1979 | Conde | 307/3 |

Primary Examiner—Joseph W. Hartary
Assistant Examiner—S. D. Schneyer
Attorney, Agent, or Firm—Cahill, Sutton & Thomas

[57] ABSTRACT

An energy management method for controlling electrical power consumption in each of a plurality of residential circuits having a plurality of loads. Each residential circuit is provided with a variable limit demand controller which includes means for receiving utility-generated demand limit signals from a remote location. A demand limit is established for each of the residential circuits which is independent of which of the specific loads in the circuit are responsible for the demand. Signals are generated by the utility from a remote location to vary the limit proportionately in all of the residential circuits.

In a preferred embodiment, in which the loads in each of the circuits include both resistive and reactive loads, each circuit is provided with separate variable limit demand controllers for the resistive loads and for the reactive loads. Separate demand limits are established for each of the residential circuits and utility-generated signals are sent from a remote location to each of the demand controllers to vary the resistive and reactive limits proportionately in all of the residential circuits. The resistive and reactive demand limits are adjustably varied to improve the power factor of the load on the utility power-generating facilities.

3 Claims, 3 Drawing Figures

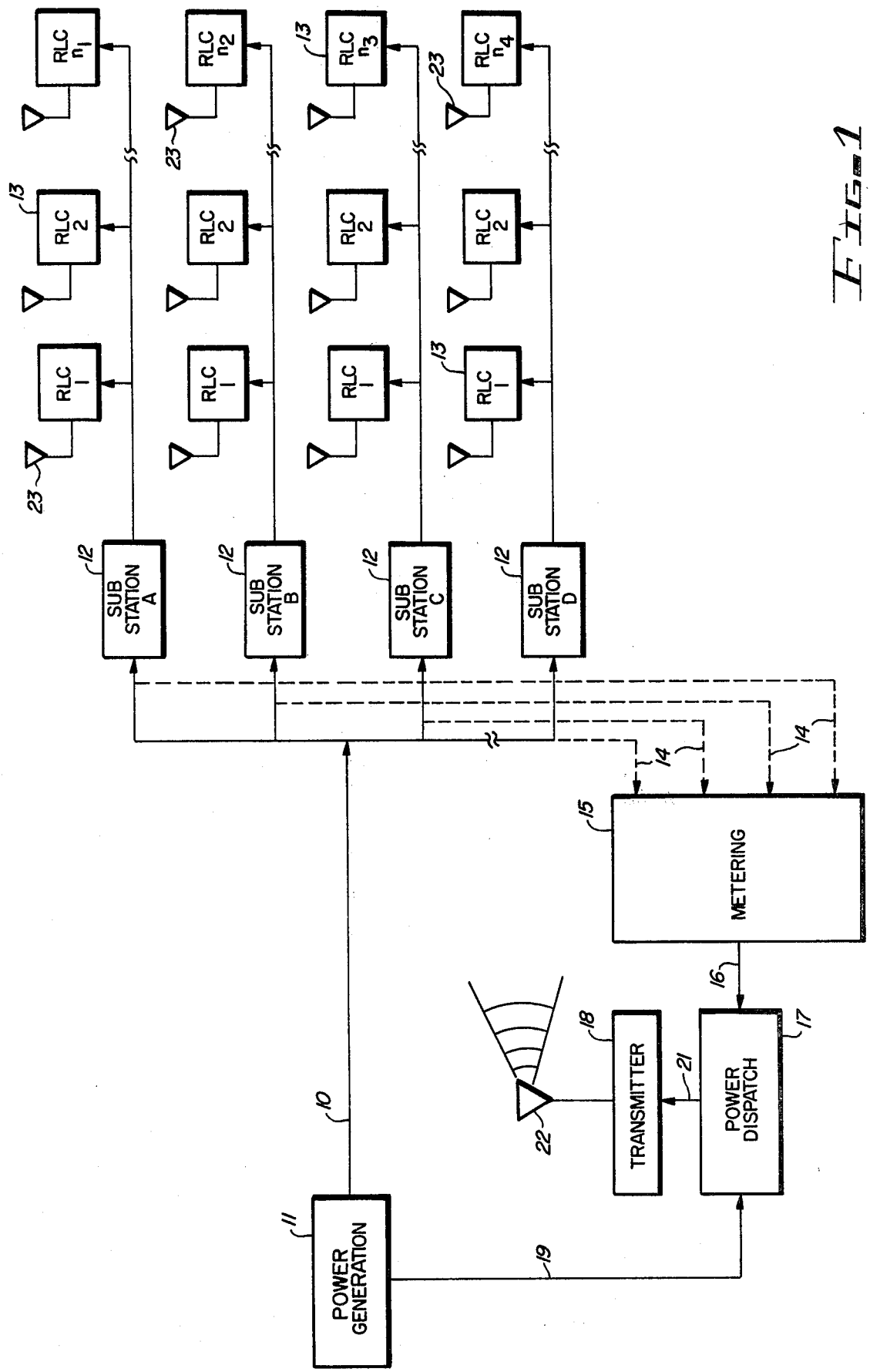

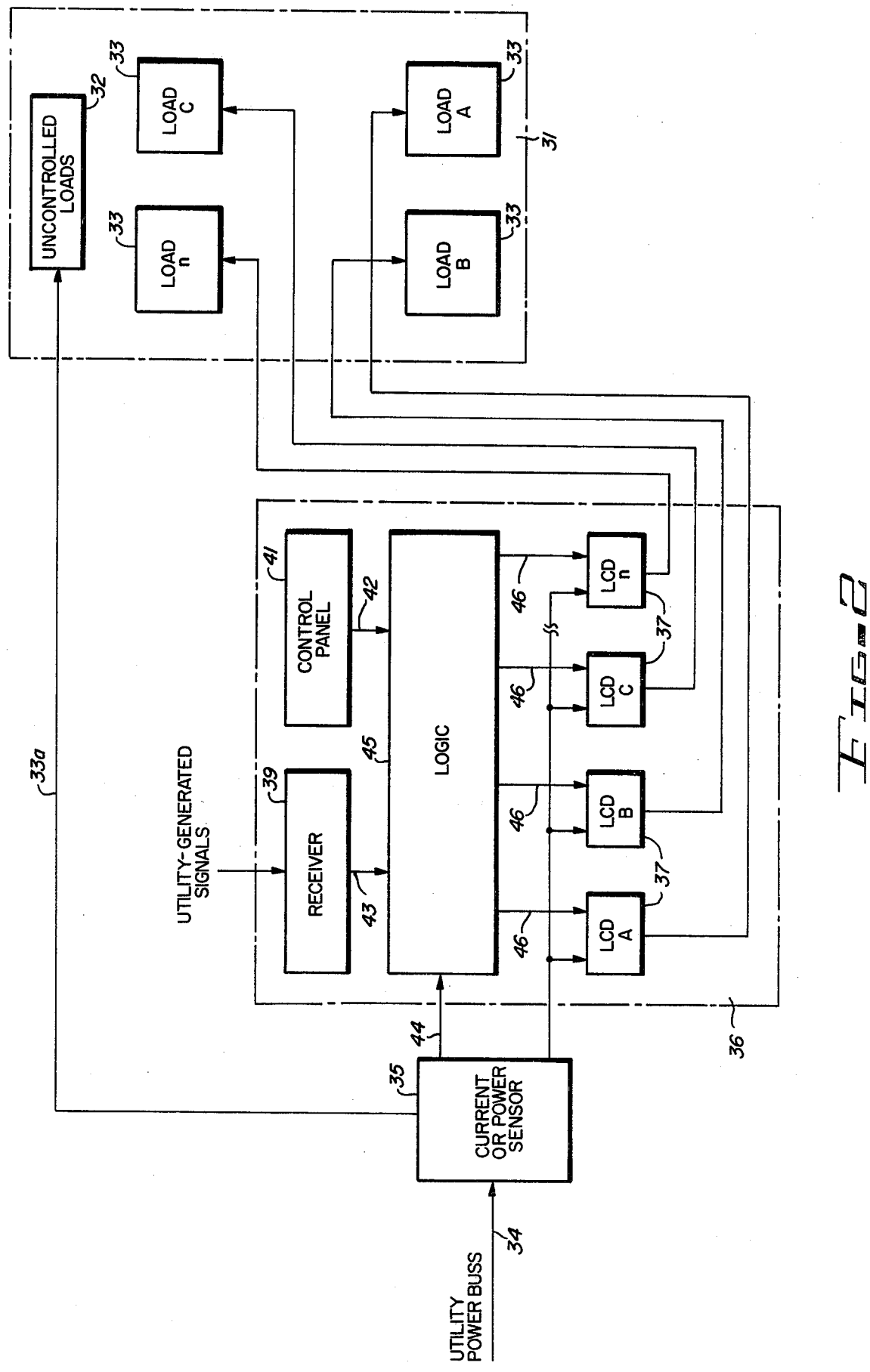

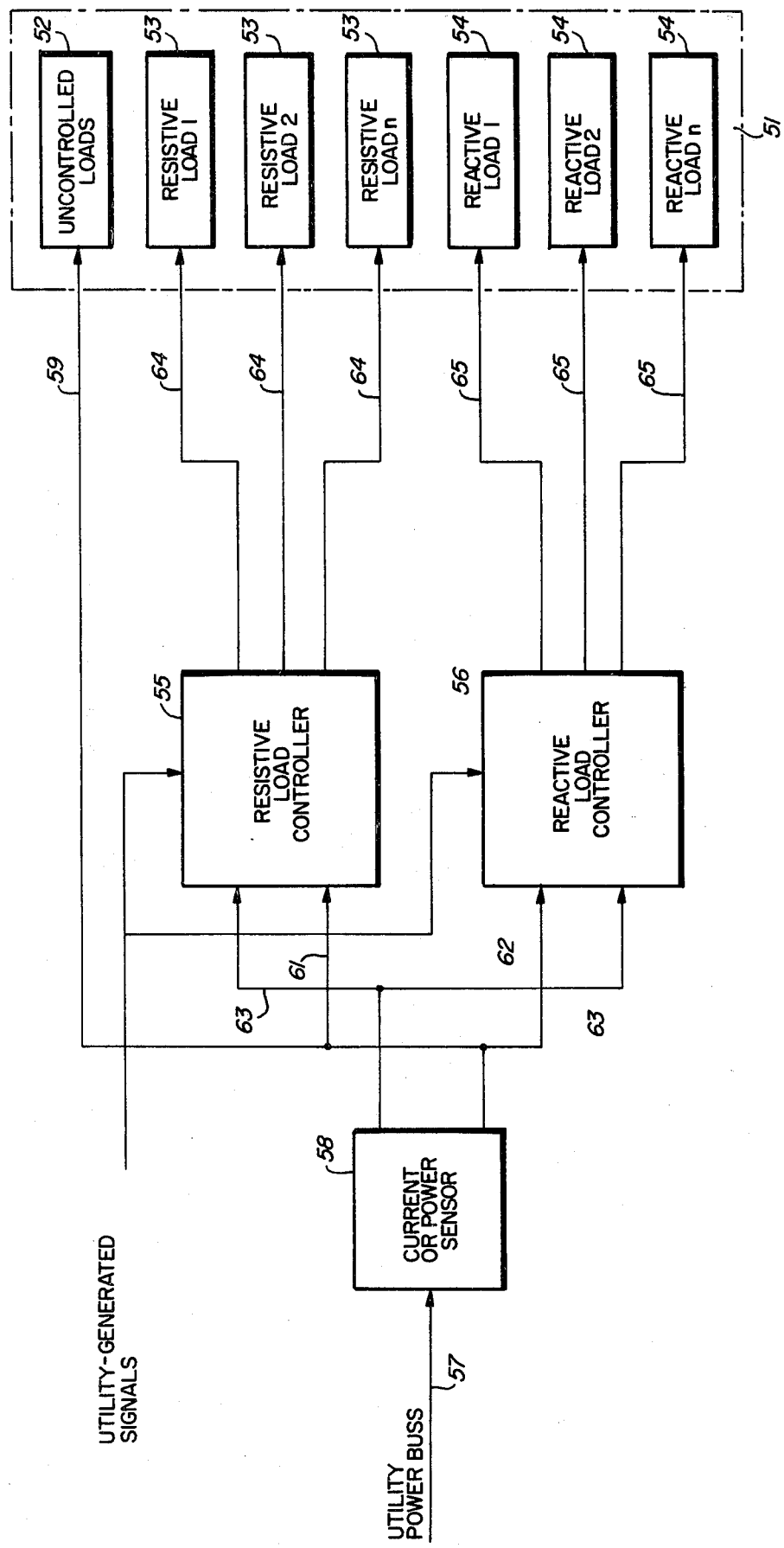

ENERGY MANAGEMENT METHOD USING UTILITY-GENERATED SIGNALS

This invention concerns a method for electrical energy management.

More particularly, the invention pertains to an electrical energy management method for controlling power consumption in a plurality of residential circuits, each circuit having a plurality of loads.

In a further and more specific aspect, the invention pertains to an energy management method which is especially adapted to permit initial selection of an energy demand limit by each residential customer but which allows the electrical utility company to vary the customer-selected demand limit by means of utility-generated signals generated at a remote location.

In still another and further respect, the invention pertains to an energy management method in which utility-generated signals are transmitted to load controllers on individual residential circuits which allow utility adjustment of the resistive and reactive components of its total load, thereby improving the power factor.

Various energy management systems have been proposed which require or at least attempt to persuade utility customers to limit their electrical energy consumption as a means of reducing their overall utility bills. According to one such proposal, the maximum load ("demand") which each customer is allowed to place on the utility's power generation facilities is arbitrarily limited. Although this "peak usage curtailment" approach is partially effective in reducing the customer's overall utility bills, it has several decided disadvantages. The customer, especially a residential user, loses a degree of flexibility in selecting and using various electrical appliances, etc., in his residence and to this extent, the peak usage curtailment program has direct and often undesirable impact on the customer's lifestyle. Secondly, the utility itself may find that the reduction in total electrical energy consumption reduces the utility's revenue to the point that it must, in turn, raise the utility charge per unit of electrical power consumed to the point that the user's electrical utility bills may even exceed the bills he customarily received before his power usage was curtailed.

In a variation of the peak usage curtailment approach, each residential customer is allowed to choose his own demand limit and is encouraged to set his own limit to the lowest possible value by imposing considerably higher rates for power used during the utility's peak demand periods. Thus, each consumer can decide for himself the extent to which peak usage curtailment programs will be allowed to interfere with his lifestyle. However, a need still exists for the utility to exercise some independent control over its total power demand, especially where the generating facilities are being utilized at or near their maximum capacities despite such peak usage curtailment. Such utility control is required in the event of an emergency requiring a shutdown of part of the generating facilities and is desirable to enable the utility to program the construction of additional generating facilities as the demand on its existing facilities rises due to population shifts and increased usage by existing customers.

To meet the necessity and desirability of a means of imposing at least partial utility control of its total load in systems which provide, initially, for individual choice of demand limit by each residential customer, methods have been developed in which utility-generated signals are transmitted from a remote location to load controllers located at each residence. According to such systems, the utility can signal the individual load controllers to shed or add specific loads such as water heaters, air conditioners, clothes dryers, cooking stoves, etc. Thus, although a particular customer may have initially selected his own demand limit to allow him to operate all or part of these appliances, even during the utility's peak demand period, the utility can override the customer's decision with respect to one or more of these appliances. While this approach may appear to be equitable (in that all of the utility's customers are deprived of their usage of the same appliances at the same time), this approach is not really fair to the residential power consumer, is not necessary and, furthermore, is not completely effective in achieving its objective of reducing the total load on the utility at a given time by a given amount. In the first place, a system in which, for example, the utility signals command that all water heaters be shed is not fair to all of the residential consumers as not all of the consumers will want to use their water heater during that period anyway and those who do are being penalized (in terms of lifestyle flexibility) in comparison to those who do not. Secondly, for the same reason, it is not usually necessary to shed all water heaters or all air conditioners in all residences served by the utility power distribution system as some of them are not being used anyway. Thirdly—a utility command to shed all water heaters or air conditioners may, nevertheless, fail to achieve the desired reduction in the utility's total load or the reduction thus achieved may be greater than anticipated and desired, causing the utility company to lose revenues and ultimately increasing the unit cost of the power to the residential consumer. Finally, a command to shed all water heaters (a resistive load) or all air conditioners (an inductive load) may cause serious imbalance between the resistive and reactive components of the utility's total load, materially and undesirably affecting the power factor of the load.

Accordingly, it would be highly desirable to provide an electrical energy management method which allows the electrical utility to modify the rate at which each individual residential customer utilizes his power, which will have the minimum impact on each of the residential customer's lifestyle, which will fairly and equitably distribute this impact among all of the residential consumers, and which will be effective in achieving the purpose for exercising such control in the first place, i.e., to effect a given reduction in the total load on the utility's generating facilities and with minimum impact on the power factor of the utility's total load.

Such a method would allow the utility to achieve its "systems" objective of reducing its total load by a given amount, yet each individual within the system retains the flexibility to use whatever amount of power he is willing to pay for. He may do this by increasing the demand limit for his own residence.

Thus, the utilities needs and the individual customers' needs are both accommodated in the same system, neither at the expense of the other.

It is therefore, an object of the present invention to provide an improved electrical energy management method.

Yet another object of the invention is to provide a method of electrical energy management which enables the utility to modify the demand limits initially selected by individual residential customers.

Still another object of the invention is to provide an energy management system which impacts fairly and equally on all of the utility's customers' lifestyles.

Finally, another object of the invention is to provide an improved energy management system which enables the utility to exercise such control without adversely affecting its power factor.

These and other, further and more specific objects and advantages of the invention will be apparent to those skilled in the art from the following detailed description thereof, taken in conjunction with the drawings, in which:

FIG. 1 schematically depicts a typical electrical power generation and distribution system which utilizes the principles of the present invention; and FIGS. 2 and 3 depicts in greater detail the apparatus which is utilized in accordance with the method of the present invention to adjust the demand limits at each individual residence within the power distribution network and to adjust the power factor of the untilities' load.

Briefly, in accordance with the invention, I provide improvements in the prior art methods for managing electrical energy consumption in a plurality of residential circuits having a plurality of loads. According to the prior art, a controller is provided for each circuit for shedding and restoring certain ones of the loads in the circuit. The controller includes means for receiving utility-generated shed-restore signals from a remote location and control of the total demand imposed on the utility power distribution system is attempted by utilizing utility-generated signals to shed or restore specific ones of the loads in the circuit.

According to the improvement of the present invention, I provide a method of electrical energy management in which each residential circuit is provided with a variable-limit demand controller, including means for receiving utility-generated demand-limit signals from a remote location. A demand limit is established for each of the residential circuits which is independent of which specific loads in the circuit are responsible for the demand and signals are generated from the remote location to vary the demand limit proportionately in all of the residential circuits.

In accordance with a presently preferred embodiment of the invention, in which the residential circuits include both resistive and reactive loads, the method of the present invention further comprises the steps of providing each residential circuit with separate varible limit demand controllers for the resistive loads and the reactive loads in the residential circuit, separate demand limits are established for the resistive and the reactive loads in the circuit and separate signals are generated by the utility from the remote location to separately vary the resistive and reactive demand limits proportionately in all of the residential circuits. The resistive and reactive demand limits are adjustably varied to achieve an improved power factor of the load on the utility power generating facilities.

As will be observed, the methods of the present invention are equally applicable whether the customer initially selects the demand limits or whether the utility arbitrarily imposes such initial demand limit.

Turning now to the drawings, FIG. 1 depicts a typical power generation-distribution system which serves a plurality of individual residential consumers in which the power 10 generated in the utility's power generation facilities 11 is transmitted through a plurality of substations 12 to individual residences, each provided with a residential load controller ("RLC") 13. As indicated by the dashed lines 14, the power consumed by the residence 13 served by each substation 12 is monitored by metering facilities 15 and the metering information 16 is provided to a power dispatch facility 17 equipped with a radio transmitter 18. Additional information 19 is supplied to the power dispatch facility 17 from the power generation facilities 11 relating to the status of the various elements of the power generation facilities, the total available power, etc. The information 19 from the power generation facilities and the metering information 16 are utilized to make decisions in the power dispatch facility 17 as to whether the total load 10 on the power generation facilities 11 must be decreased or can be increased and the amount of such decrease or increase. These decisions, in the form of demand limit increase or decrease signals 21 are sent to the transmitter 18 which transmits the commands from the radio transmitting antenna 22 to the receiving antennas 23 located at each of the residential load controllers 13.

For example, if the decision is made in the power dispatch facility 17 that the total load 10 on the utility's power generation facility 11 must or should be reduced by a given amount, commands are sent from the transmitter antenna 22 to the receiving antennas 23 of each of the residential load controllers 13 to reduce the demand limit in each individual residence by an equal percentage, which total reduction equals the desired reduction of the total load 10 if each residence is using power at or just under its respective demand limit. If, however, some of the individual residences are not using power at their respective demand limtis, the reduction in the total load 10 on the generating facilities 11 may not be completely effected and power dispatch facility 17 may issue a second and possible subsequent commands for a further percentage reduction in the demand limits in each of the residences.

Upon completion of these measures, the utility will have acheived the desired reduction in the total load 10 on its generation facilities 11. Similarly, the utility may determine through its power dispatch facilities that the total load 10 on the power generation facilities 11 may be desirably increased and signals are transmitted to the individual load controllers 13 to effect an equal percentage increase in the demand limits of each of the controllers 13.

Also, it will be observed that the utility company's objective has been fulfilled with a minimum and equal impact upon the lifestyle of the power consumers in each of the residences, i.e., the demand limit (previously selected by each consumer or imposed by the utility on each consumer) has been adjusted downwardly (or upwardly where possible) without arbitrarily imposing on the consumer the choice as to which specific appliances or loads in his residence must be turned off in order to avoid exceeding the new demand limit. Thus, customer 1 of sub-station "a" who may be drying laundry can continue doing so provided he is willing to forego a simultaneous hot shower and customer 2 of sub-station "n", who is away from home, can nevertheless keep his residence cool and his pool clean by the automatic operation of his air conditioner and pool filtration pump because he does not need to use cooking, laundry or bathing vacilities while away from home. However, as will be noted, each residential consumer has been subjected to precisely the same utility-control, namely, the demand limit for each residence has been reduced by an equal percentage. Furthermore, during off-peak hours or when additional generating facilities are put on line by the utility company, the individual residential demand limits can be restored simultaneously and by a similarly equal percentage.

As will be apparent to those skilled in the art, any one of various suitable means can be employed to transmit the signals from the transmitter 18 to the RLC's 13. For example, instead of the radio transmission facilities depicted in FIG. 1, the signals could be transmitted for the transmitter 18 to the RLC 13 by telephone lines or by high frequency signals imposed on the power company's own distribution lines. Similarly, each sub-station in the power distribution network of FIG. 1 could make its own power dispatch decisions and transmit the demand limit commands directly to its own residential consumers.

The operation of the residential load controllers (RLC's) 13 of FIG. 1 is further illustrated in FIG. 2 which schematically depicts the elements which are utilized in accordance with the invention at each individual residence. A residence 31 is depicted which has a plurality of loads consisting of uncontrolled loads 32 and controlled loads 33 comprising a residential circuit. Electrical power 34 is transmitted from the utility power buss through a sensor 35 which may, for example, measure either instantaneous power or current demand. The power is transmitted directly from the sensor 35 to the uncontrolled loads 32 via the line 33a. However, power to the controlled loads is transmitted through a residential load controller (RLC) 36 which contains a plurality of on-off load controlled devices (LCD) 37. Utility generated signals 38 from a radio antenna, telephone line, or from the utility's own power line are fed to a receiver 39. A control panel 41 is provided which allows each residence consumer to select and impose an upper limit on the demand which can be imposed by all of the loads (controlled and uncontrolled) in the residence 31.

The customer-selected demand limit information 42, the received utility-generated signals 43 and the total demand information data 44 are fed to the logic 45 of a computer such as a microprocessor which correlates the information and transmits shed-restore commands 46 to the load controlled devices 37.

The operation of the system of FIG. 2 in accordance with the method of the invention may be illustrated by assuming that the residential consumer has imposed a demand limit of 10 kw on his residence and, with all loads in operation, the actual demand imposed by the loads is 9.8 kw. In order to effectuate a reduction in its overall load, the utility generates signals commanding a 10% reduction in demand limits for all residences in its distribution network. These signals 38 are detected to the receiver 39 and fed to the logic of the microprocessor which overrides the customer-selected 10 kw demand limit and reduces the limit to 9.0 kw. The logic 45 of the microprocessor will generate sequentially shed signals 46 to a sufficient number of the LCD's 37 to shed enough loads to reduce the actual demand of the residence 31 to 9.0 kw or lower.

When it is possible for the utility company to raise the demand limits for its customers, appropriate command signals can be sent to the load controller 36 to countermand any previous limit-decrease commands, restoring the demand limit to the value selected by the residential consumer by manipulation of the controllers 41. If the initial demand limit had been imposed by the utility through the signals 38 received and transmitted to the logic 45, this demand limit or an even higher demand limit may be imposed through additional signals 38 received and transmitted to the logic 45. In either case, upon sensing the higher demand limit, the logic 45 issues restore signals to the load control devices 37 to restore loads previously shed until the metering data 44 reflects that the total load on the residence 31 is either equal to or just below the demand limit.

The restoration of the loads may be accomplished in the reverse sequence in which they were shed (the customer establishing such load priority) or in accordance with various other restoration sequences. In the presently preferred embodiment of the invention, the loads are restored in reverse sequence of shedding, if possible, but if such sequential restoration is impossible, the loads may be restored out of sequence until the total load is as close as possible to the demand limit, without exceeding the limit. This load restoration optimization method which is utilized in accordance with the presently preferred embodiment of the present invention is disclosed in the co-pending application of Hedges et al, Ser. No. 909,850, filed May 26, 1978, entitled "ELECTRICAL LOAD RESTORATION METHOD".

As previously mentioned, the utility-generated signals may be transmitted to the load controller 36 of FIG. 2 by any suitable technique. In the presently preferred embodiment of the invention, the receiver 39 is an FM multiplex receiver and the logic 45 is contained in a semi-custom microprocessor Model MC6801 manufactured by Motorola. In the presently preferred embodiment, the LCD's 37 are triac but, as will be apparent to those skilled in the art, other devices such as conventional relays could be employed. In the presently preferred embodiment of the invention, the meter 35 of FIG. 2 is a conventional residential electrical utility meter modified in accordance with the disclosure of the co-pending application Ser. No. 923,010, of Paul J. Emerson, filed July 10, 1978, entitled "OPTICAL SYSTEM FOR TRANSMITTING ELECTRICAL ENERGY CONSUMPTION SIGNALS FROM A UTILITY METER", which utilizes a fiber-optics bundle extending inside the enclosure to sense light signals generated inside the enclosure in response to the rotation of the disk to transmit the light signals to a photosensitive device outside the meter enclosure, which signals are converted by a counter and appropriate logic to instantaneous power demand-limit information. However, any other suitable meter could be employed which provides either instantaneous power demand or instantaneous current demand information.

The methods of the invention, described above, can also be utilized, in accordance with a further preferred embodiment of the invention, to improve the power factor of the utility company's total load or the power factor of the load on any one of the one or more subdivisions of the utility company's power distribution network such as, for example, the power factor of a load on any one particular utility substation. As is well known to those skilled in the art, the power factor of a load is dependent upon the relationship of the resistive and the reactive components of the load. The typical residential load consists of resistive loads such as water heaters, cooking stoves, electric clothes dryer heaters, incandescent lights, etc., and the reactive components of the load are usually inductive components such as electric motors which drive air conditioning compressors, swimming pool filtration pumps, refrigerator compressor motors, and the motors used to drive laundry equipment such as washers and dryers. Reactive loads which are capacitive are not commonly found in residential circuits although capacitive motors and capacitive ballasts for fluorescent lights are known and might, on occasion, be included in a residential circuit. Thus, although the following description of this preferred embodiment refers to inductive loads as the reactive component of the total residential load, it is within the scope of the invention to adjustably control reactive loads in general, whether inductive or capacitive.

One of the chief disadvantages of the prior art load management system, described above, in which the utility company signals the individual residential load controllers to shed or restore all water heaters or to shed or restore all air conditioning units is that such actions immediately, directly and adversely affect the power factor of the utility company's total load. Accordingly, it would highly desirable to provide a method whereby the power company could selectively add or restore both resistive and reactive components of its total load, maintaining the resultant relationship of resistive and reactive components to obtain the maximum possible power factor. Such an objection can be achieved in accordance with a preferred embodiment of the method of the present invention as described in connection with FIG. 3.

FIG. 3 depicts the components of a system which can be utilized in accordance with the method of the present invention to adjustably vary the resistive and reactive demand limits of a typical residential circuit to maintain the power factor of the load as close to unity as possible. As shown in FIG. 3, each residential circuit 51 consists of uncontrolled loads 52 which may be both resistive and reactive loads as well as controlled resistive loads 53 and controlled reactive loads 54. As depicted in FIG. 3 for purposes of clarity of illustration, the resistive loads are controlled by a resistive load controller 55 and the reactive loads are controlled by a reactive load controller 56. Although these are shown as separate load controllers, each of which contain the components of the load controller 36 of FIG. 2, it will be obvious to those skilled in the art that the functions of the receivers, control panels and logic of the separate load controller 55 and 56 can and would be combined in actual practice. Referring further to FIG. 3, incoming power or current from the utility company power buss 57 is sensed 58. The power thus sensed is transmitted to the uncontrolled loads 52 through the electrical lines 59 and the power to the contro-led loads is transmitted to the resistive load controller 55 through the line 61 and to the reactive load controller 56 through the line 62. Metering information is supplied to the load controllers 55 and 56 from the sensor 58 through the lines 63. Power is supplied to the resistive loads 53 from the resistive load controller 55 through the lines 64 and power to the reactive 54 is supplied from the reactive load controller 56 through the lines 65.

The following example illustrates the practice of a method which is a preferred embodiment of the invention in which the utility company is able to maintain a favorable power factor while simultaneously reducing the overall load on its generating facilities. If it is assumed that the residential curcuit of FIG. 3 is utilizing power at an instantaneous rate of 10 kw, and that the resistive component of this load is 4 kw and the inductive component is 6 kw, the power factor of this total load is the ratio of the resistive load to the inductive load, i.e., 0.66. (This is an exceedingly low power factor but the utility company depends upon the averaging effect of several thousand residences served by a single sub-station, some of which have much higher power factors and the sub-station's power factor is further improved by artificially adding capacitive loads at the sub-station). Further, it is assumed that either the residential customer or the utility has imposed a 10 kw demand limit on the residential circuit 51. If the power company merely sends a command signal to reduce the demand limit by 20%, i.e., to 8 kw, and the system reacts by shedding a resistive load of 2 kw, leaving the 6 kw inductive load inaffected, the resultant power factor will be only 0.33. However, if the utility company's signal to reduce demand limits by 20% is applied equally to both the resistive and the inductive loads, causing the system to shed a resistive load of 0.8 kw and an inductive load of 1.2 kw, the resultant power factor will remain at 0.66, as before the command was received.

More pointedly, if the utility company wishes to improve the power factor of its load, it can signal a reduction of demand limits on only inductive loads. for example, if the 20% reduction in demand limit is applied only to the inductive loads of the residential circuit 51, causing the system to shed a 2 kw inductive load, then the resistive and inductive loads will be equal and the power factor will be 1.00, the theoretical maximum.

While the foregoing example assumes, for clarity of illustration, that the total load on the residential circuit 51 is just equal to the demand limit at all times (a situation which is not likely to exist in actual practice), the example does illustrate that the power company, while making a given reduction in demand limits, still retains a degree of flexibility in selecting how that reduction is accomplished to maintain or perhaps even improve its power factor.

Having described my invention in such terms as to enable those skilled in the art to understand and practice it, and having identified the presently preferred embodiments thereof,

I claim:

1. In an energy management method for controlling electrical power consumption in each of a plurality of residential circuits having a plurality of loads including non-thermal loads having unpredictable demands, each said circuit having a controller for shedding and restoring certain ones of the loads in said residential circuit and including means for receiving utility-generated shed-restore signals form a remote location, and controlling the use by the residential consumer of certain of the loads in his residence by utility-generated shed-restore signals, the improvement in said method comprising the steps of:
   (a) providing each residential circuit with a variable-limit controller which limits the total demand imposed by said plurality of loads, including (i) means for receiving utility-generated demand-limit signals from a remote location; and (ii) means whereby each said consumer can optionally override said demand-limit signals;
   (b) establishing a total demand limit for each of said residential circuits which is independent of which of the specific loads in said residential circuit are responsible for said demand;
   (c) generating signals from said remote location to reduce said total demand limit by an equal percentage in all of said residential circuits;

(d) measuring the total load on said utility imposed by said plurality of residential circuits; and (e) generating successive demand-limiting signals until said total load on said utility is reduced to a value preselected by said utility.

2. In the energy management method of claim 1 and in which the plurality of loads in said residential circuits include both resistive and reactive loads, the further improvement in said method comprising the steps of (a) providing each residential circuit with separate variable-limit demand controllers, for the resistive loads in said circuit and for the reactive loads in said circuit, including means for receiving utility-generated resistive demand-limit signals and reactive demand-limit signals from a remote location;

(b) establishing separate resistive demand limits and reactive demand limits for each of said residential circuits, each of which limits is independent of which specific resistive or reactive load in said residential circuit is responsible for said demand;

(c) generating signals from said remote location to separately vary said resistive and reactive limits proportionately in all of said residential circuits; and (d) adjusting varying said resistive and reactive demand limits to improve the power factor of the load on the utility generating facilities.

3. Method of claim 2 in which said reactive loads are inductive loads and said reactive demand limits are inductive demand limits.

* * * * *